(12) United States Patent
Glass et al.

(10) Patent No.: US 9,789,947 B2
(45) Date of Patent: Oct. 17, 2017

(54) AEROSTAT SYSTEM WITH EXTENDED FLIGHT ENVELOPE

(71) Applicant: Altaeros Energies, Inc., Somerville, MA (US)

(72) Inventors: Benjamin W. Glass, Somerville, MA (US); Christopher R. Vermillion, Boston, MA (US); Ephraim R. Lanford, Cambridge, MA (US)

(73) Assignee: Altaeros Energies, Inc., Somerville, MA (US)

( * ) Notice: Subject to any disclaimer, the term of this patent is extended or adjusted under 35 U.S.C. 154(b) by 219 days.

(21) Appl. No.: 14/372,844

(22) PCT Filed: Jan. 17, 2013

(86) PCT No.: PCT/US2013/021837
§ 371 (c)(1),
(2) Date: Oct. 16, 2014

(87) PCT Pub. No.: WO2013/109689
PCT Pub. Date: Jul. 25, 2013

(65) Prior Publication Data
US 2015/0083849 A1    Mar. 26, 2015

Related U.S. Application Data

(60) Provisional application No. 61/587,338, filed on Jan. 17, 2012.

(51) Int. Cl.
*B64B 1/66* (2006.01)
*B64B 1/52* (2006.01)
(Continued)

(52) U.S. Cl.
CPC ............... *B64B 1/66* (2013.01); *B64B 1/06* (2013.01); *B64B 1/52* (2013.01); *B64F 1/14* (2013.01)

(58) Field of Classification Search
CPC .... B64B 1/50; B64B 1/52; B64B 1/56; B64B 1/66; B64C 2201/148; B64F 1/14; B64F 3/00; F05B 2240/922
See application file for complete search history.

(56) References Cited

U.S. PATENT DOCUMENTS

| 653,221 A * | 7/1900 | Deydier | B61B 5/02 |
| | | | 104/22 |
| 1,724,890 A * | 8/1929 | Upson | B64F 1/14 |
| | | | 244/116 |

(Continued)

FOREIGN PATENT DOCUMENTS

| EP | 0045202 A1 | 2/1982 |
| EP | 0935068 A2 | 8/1999 |

(Continued)

OTHER PUBLICATIONS

International Preliminary Report on Patentability mailed Apr. 3, 2014 for corresponding International Application No. PCT/US2012/055898.

(Continued)

*Primary Examiner* — Joseph W Sanderson
(74) *Attorney, Agent, or Firm* — Wolf, Greenfield & Sacks, P.C.

(57) ABSTRACT

An aerostat system with an extended flight envelope in which the aerostat system can safely operate is provided. The aerostat system includes an aerostat, multiple tether groups and a base station. Spatially distinct tether groups allow for improved stability and controllability over a wide range of wind conditions. Independent actuation of the tether groups allows for control of the aerostat pitch and roll angle. A rotating platform including rails to rest the aerostat allows docking without auxiliary tethers, minimizing or eliminating the ground crew required to dock traditional (Continued)

aerostat systems. An optional controller allows remote or autonomous operation of the aerostat system.

15 Claims, 5 Drawing Sheets

(51) Int. Cl.
  B64F 1/14 (2006.01)
  B64B 1/06 (2006.01)

(56) References Cited

U.S. PATENT DOCUMENTS

| | | | |
|---|---|---|---|
| 1,812,237 A * | 6/1931 | Garcia | B64B 1/66 244/116 |
| 1,823,466 A * | 9/1931 | Powelson | B64F 1/14 244/116 |
| 1,845,229 A | 2/1932 | Bradshaw | |
| 1,848,828 A * | 3/1932 | Griffin | B64F 1/14 244/116 |
| 2,433,344 A * | 12/1947 | Crosby | B64B 1/40 244/17.13 |
| 2,704,193 A * | 3/1955 | Alard | B64B 1/66 244/116 |
| 3,972,492 A * | 8/1976 | Milne | B64B 1/06 244/128 |
| 3,972,493 A | 8/1976 | Milne | |
| 4,165,468 A | 8/1979 | Fry et al. | |
| 4,166,596 A | 9/1979 | Mouton, Jr. et al. | |
| 4,207,026 A | 6/1980 | Kushto | |
| 4,285,481 A | 8/1981 | Biscomb | |
| 4,309,006 A | 1/1982 | Biscomb | |
| 4,350,896 A | 9/1982 | Benoit | |
| 4,350,897 A | 9/1982 | Benoit | |
| 4,350,898 A | 9/1982 | Benoit | |
| 4,350,899 A | 9/1982 | Benoit | |
| 4,450,364 A | 5/1984 | Benoit | |
| 4,470,563 A | 9/1984 | Engelsman | |
| 4,789,302 A | 12/1988 | Gruzling | |
| 4,832,571 A | 5/1989 | Carrol | |
| 5,080,302 A | 1/1992 | Hoke | |
| 5,431,359 A | 7/1995 | Belie | |
| 5,497,962 A | 3/1996 | Wood | |
| 5,509,624 A * | 4/1996 | Takahashi | B64B 1/66 244/115 |
| 5,836,738 A | 11/1998 | Finney | |
| 6,224,015 B1 | 5/2001 | Reinhard | |
| 6,382,904 B1 | 5/2002 | Orlov et al. | |
| 6,523,781 B2 | 2/2003 | Ragner | |
| 7,188,808 B1 | 3/2007 | Olson | |
| 7,275,719 B2 * | 10/2007 | Olson | F03D 5/04 244/153 R |
| 7,335,000 B2 | 2/2008 | Ferguson | |
| 7,582,981 B1 | 9/2009 | Meller | |
| 8,018,079 B2 * | 9/2011 | Kelly | F03D 5/04 290/1 R |
| 8,100,366 B2 | 1/2012 | Milanese et al. | |
| 8,253,265 B2 | 8/2012 | Glass | |
| 8,539,746 B2 | 9/2013 | Ippolito | |
| 8,544,788 B1 | 10/2013 | Capper | |
| 8,602,349 B2 * | 12/2013 | Petrov | B64C 39/022 244/17.23 |
| 8,624,421 B2 | 1/2014 | Ippolito | |
| 9,187,165 B2 * | 11/2015 | Vermillion | B64B 1/00 |
| 2002/0040948 A1 | 4/2002 | Ragner | |
| 2007/0013196 A1 | 1/2007 | Chen | |
| 2007/0120004 A1 | 5/2007 | Olson | |
| 2007/0120005 A1 | 5/2007 | Olson | |
| 2007/0126241 A1 * | 6/2007 | Olson | F03D 5/04 290/55 |
| 2008/0048453 A1 | 2/2008 | Amick | |
| 2009/0033098 A1 | 2/2009 | Griffith et al. | |
| 2009/0072092 A1 | 3/2009 | Griffith et al. | |
| 2010/0019091 A1 | 1/2010 | Milanese et al. | |
| 2010/0032947 A1 | 2/2010 | Bevirt | |
| 2010/0133385 A1 | 6/2010 | Olson | |
| 2010/0213718 A1 * | 8/2010 | Kelly | F03D 5/04 290/55 |
| 2011/0315810 A1 | 12/2011 | Petrov | |
| 2012/0049533 A1 * | 3/2012 | Kelly | F03D 5/04 290/55 |
| 2013/0075523 A1 * | 3/2013 | Vermillion | B64B 1/50 244/96 |
| 2016/0122014 A1 * | 5/2016 | Jang | B64B 1/52 244/25 |
| 2016/0139601 A1 | 5/2016 | Vermillion et al. | |

FOREIGN PATENT DOCUMENTS

| | | |
|---|---|---|
| JP | 1986-085297 A2 | 4/1986 |
| JP | 1988-227499 A2 | 9/1988 |
| JP | 1988-235197 A | 9/1988 |
| JP | 1988-235198 A | 9/1988 |
| JP | 2009-511198 A | 11/1997 |
| JP | 2003-137189 A2 | 5/2003 |
| KR | 10-2010-0065856 | 4/2012 |
| WO | WO 2010/006433 A1 | 1/2010 |
| WO | WO 2011/012996 A2 | 2/2011 |
| WO | WO 2013-043586 A2 | 3/2013 |
| WO | WO 2013-109689 A1 | 7/2013 |

OTHER PUBLICATIONS

International Preliminary Report on Patentability mailed Jul. 31, 2014 for corresponding International Application No. PCT/US2013/021837.
International Search Report and Written Opinion mailed Mar. 18, 2013 for corresponding International Application No. PCT/US2012/055898.
International Search Report and Written Opinion mailed May 13, 2013 for correspondng International Application No. PCT/US2013/021837.
Extended European Search Report mailed Sep. 28, 2015 for corresponding European Application No. 13738570.4.
International Search Report and Written Opinion mailed Feb. 28, 2017 for corresponding International Application No. PCT/US2016/062266.

* cited by examiner

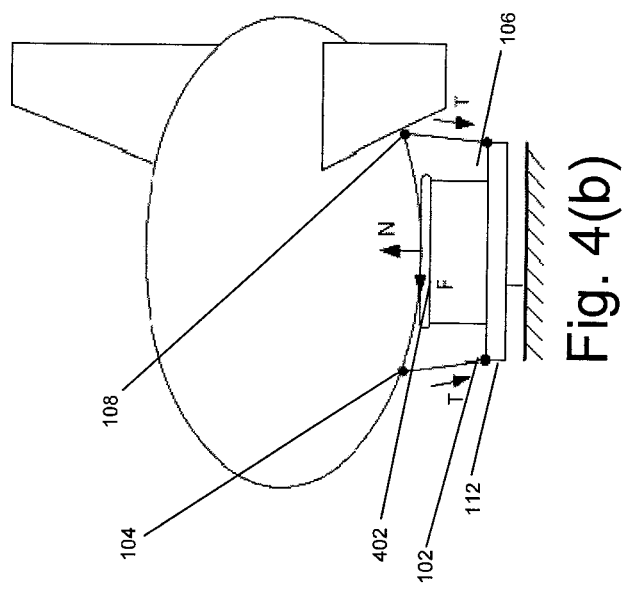
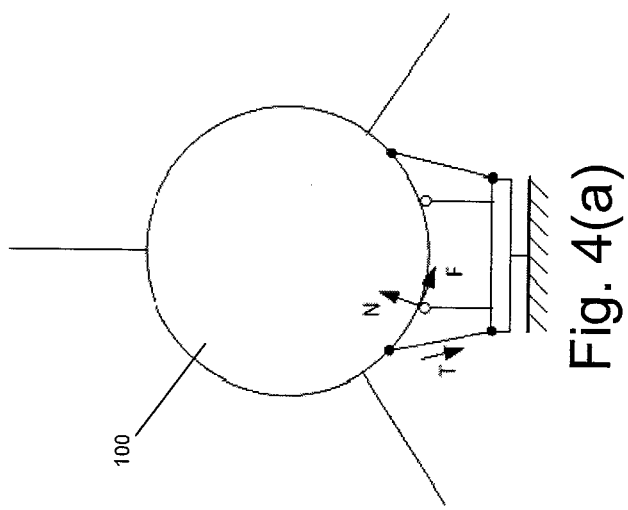

AEROSTAT SYSTEM WITH EXTENDED FLIGHT ENVELOPE

CROSS-REFERENCE TO RELATED APPLICATIONS

This application is a National Stage Entry of PCT Patent Application No. PCT/US2013/021837, entitled "IMPROVED AEROSTAT SYSTEM," filed on Jan. 17, 2013, which claims priority under 35 U.S.C. §119(e) to U.S. Provisional Application Ser. No. 61/587,338, entitled "AEROSTAT SYSTEM" filed on Jan. 17, 2012.

FIELD OF THE INVENTION

The present invention relates to configuration of aerostat systems and the airborne and docking operation of these systems.

BACKGROUND OF THE INVENTION

Aerostats, or moored balloons, are finding increasing use in applications as diverse as surveillance, weather monitoring and renewable energy. Their inherent reliability, low cost and ability to loiter on station for long durations with minimal maintenance or fuel use provide a unique combination of capabilities unmatched by heavier-than-air flight vehicles or satellites. However, aerostats suffer from high downtime and are susceptible to damage in adverse wind conditions. In addition, a full time ground crew is typically required to control the aerostat during launch and landing operations, which significantly increases the operating cost of aerostat systems.

A typical aerostat system consists of an envelope filled with a lighter-than-air (LTA) gas to provide buoyant lift; a base station consisting of a rotating platform with mounting tower and a winch or actuator; and a single main tether connecting the envelope and base station winch. A functional payload is often suspended within or below the envelope.

In flight configuration a specified length of tether is paid out and the buoyant force of the contained LTA gas lifts the envelope and payload. Fins on the envelope may be used to ensure the envelope passively orients into the wind, but the aerostat is otherwise constrained only by the tether. In high winds, the drag force on the aerostat blows the aerostat down wind and reduces the flight altitude. Typical aerostats in flight configuration are susceptible to down drafts, in which a downward vertical component of wind speed results in a rapid loss of altitude and slack in the tether. When the down draft passes and the buoyant force regains dominance the aerostat quickly rises until the tether snaps taught. This shock load is a leading cause of damage to the tether and aerostat envelope, and for this reason, aerostats are often grounded whenever downdraft conditions might occur.

During docking, the winch or actuator will typically reel in the main tether, drawing the aerostat in toward the base station. When the aerostat is near enough, ground crew feed auxiliary tethers into auxiliary winches on the base station. There is typically at least one auxiliary nose tether which is fed in through the mounting tower on the base station platform, which, in combination with the main tether and other auxiliary tethers, allows the aerostat to pivot with the base station platform about a designated axis. Ground crews must be highly skilled because the aerostat can become highly unstable if the auxiliary tethers are improperly secured, resulting in damage to the aerostat, payload and/or base station.

There is currently a strong push towards increasing the safe flight regime of aerostat systems in order to minimize the down time due to weather. In addition, eliminating all or part of the flight crew, whose primary responsibilities include overseeing launch and landing operations, can significantly reduce the cost of operating aerostats. The present invention describes an aerostat system that realizes both an increased stable flight regime and reduced ground crew requirements.

SUMMARY OF THE INVENTION

The invention overcomes disadvantages of the prior art by providing an improved aerostat system that includes an aerostat, multiple tether groups and a base station. Spatially distinct tether groups allow for improved stability and controllability over a wide range of wind conditions. Independent actuation of the tether groups allows for control of the aerostat pitch and roll angle. A rotating platform including rails to rest the aerostat allows docking without auxiliary tethers, minimizing or eliminating the ground crew required to dock traditional aerostat systems. An optional controller allows remote or autonomous operation of the aerostat system. The invention is intended to extend the flight envelope in which aerostat systems can safely operate.

In an illustrative embodiment an aerostat system, and corresponding tethering method, which allows for improved control in a variety of wind conditions, passive alignment into the wind, and autonomous docking is provided. This system and method includes multiple tether groups arranged on the shroud of an aerostat so that there is defined substantial separation distance between tether attachment points in each of a longitudinal (forward/aft), direction and a lateral (side/side) direction, each of the multiple tether groups being independently actuated by a respective winch assembly. Additionally, the system and method includes a base station located with respect to a ground surface including a rotating platform, the platform interconnected to the multiple tether groups and including a rail assembly that selectively engages the aerostat in a docked configuration with respect to the platform. The system further includes forward tether lead-off points and aft tether lead-off points on the base station. The forward tether lead-off points are separated from the aft-tether lead-off points at a lead-off-point separation distance that is approximately similar to a forward and aft separation of the tether attachment points on the shroud, thereby defining a parallel linkage that constrains the aerostat pitch angle relative to the ground, such as, but not limited to, a relative non-zero angle of between approximately 5 and 10 degrees. Illustratively, the base station is constructed and arranged to vary a lateral separation distance between one or a plurality (e.g. one or two) of forward tether lead-off points relative to a lateral separation between a plurality of, or one, (e.g. two or one) aft tether lead-off points. This arrangement, which can define a three-point "tricycle" or four-point tether harness) mechanically constrains a roll angle response to lateral translation of the aerostat with respect to the base station. Illustratively, the tether groups impart a moment to both the aerostat and the rotating platform, thereby causing both components to passively align into the prevailing wind direction.

BRIEF DESCRIPTION OF THE DRAWINGS

The invention description below refers to the accompanying drawings, of which:

FIGS. 4(a) and 4(b) are each schematic illustrations of the resultant forces on the aerostat in docked configuration in each of an end-on (axial) and lateral view, respectively.

DETAILED DESCRIPTION

Figure 1:
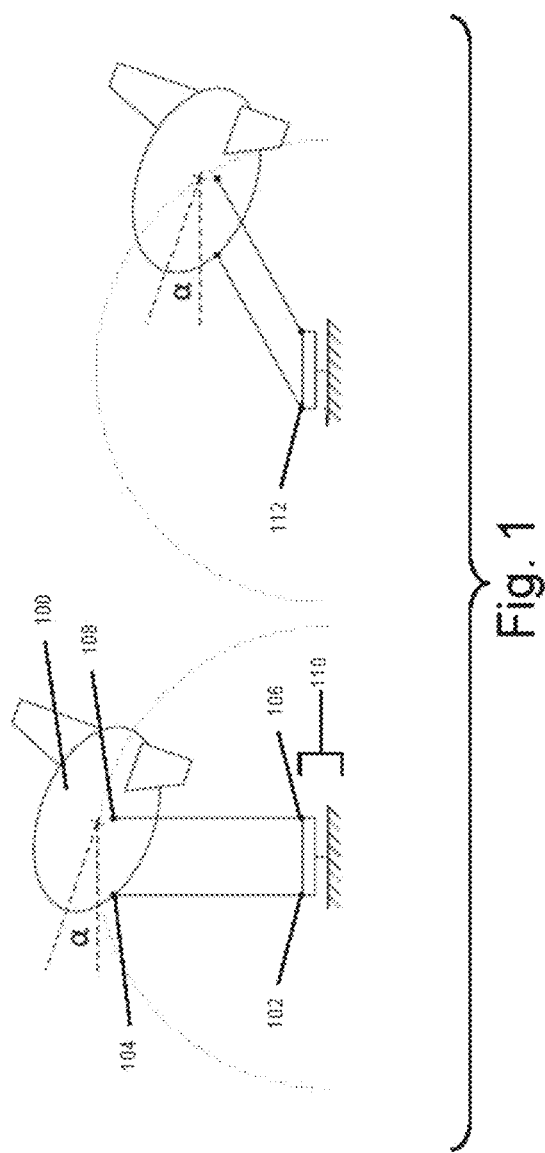
FIG. 1 is a two-part schematic illustration of parallel bar linkages maintaining the pitch angle of an aerostat during blowdown.

The present invention concerns an improved aerostat system ("the invention") consisting of an aerostat, three or more load bearing main tether groups and a base station. The invention provides for an increased stable flight regime compared with current state-of-the-art aerostats. Means for securely docking the aerostat without auxiliary ground anchors are provided, and, in conjunction with a remote or automated controller, reduce or eliminate the need for a ground crew to perform launch and landing operations.

Aerostat and Tether

The invention is intended to encompass any form or design of aerostat. Referring to an illustrative embodiment represented in FIG. 1, each of the main tether groups terminates at a spatially distinct attachment point 104/108 on the aerostat 100 and lead-off point 102/106 on the base station 110. Each tether group may be independently actuated with a winch system or other actuator on the base station. The tether attachment points are defined as the location at which the main tethers interface with the envelope, or, if multi-line harnesses are used to attach the tethers to the aerostat, the mean location of the harness line attachments for each tether group. The mean tether attachment point is defined as the tension weighted average location of the individual tether attachment points. The tether attachment points are arranged such that there is substantial separation between attachment points in both the forward/aft, or longitudinal, direction and side/side direction. Each of the main tether groups is routed through spatially distinct lead-off points 102/106 on the platform 112 and originates from a winch system or other actuator ("winch") on the platform, with any number of intermediate tether routing steps in between. The mean lead-off position is defined as the tension-weighted average position of the multiple tether group lead-off positions.

In an illustrative embodiment of the invention, the aerostat geometry is designed to produce an aerodynamic lift force to limit blow down and maintain operational altitude in high wind speeds. In such an embodiment where the aerodynamic lift and aerodynamic lift-to-drag ratio are functions of the pitch angle of the aerostat, the forward and aft tether lengths may be adjusted, via their independent winches, such as to modify the pitch angle and resultant aerodynamic properties of the aerostat. This may be done for any reason, such as, but not limited to, increasing pitch angle to prevent a loss of tether tension during downdrafts or reducing pitch angle to limit tether tension in high wind speeds.

Base Station

Referring to FIG. 3, an embodiment of the base station consists of a base and a rotating platform ("platform") 112 connected to the base by a slew bearing or other pivot mechanism. The pivot mechanism defines a pivot axis P about which the platform may rotate. The rotation of the platform about the pivot axis can be free or can be actuated in order to align the platform with a specified heading. Referring to FIG. 4, the platform 112 has one or more rails ("rail") 402 upon which the aerostat sits in the docked configuration.

By judiciously positioning the pivot axis location relative to the mean lead-off location, the tethers can impart acting moments on the platform that cause it to align in a particular direction. In an illustrative embodiment of the invention in FIG. 3, the pivot axis P 'location is substantially forward of the mean lead-off location, preferably in line or forward of the forward lead-off point(s) 102(a) and 102(b). This ensures that the mean tension force in the tethers imparts a moment on the platform which acts to align the horizontal component of the tether direction with the platform longitudinal direction, defined by a line extending from the mean lead off location to the pivot axis.

Furthermore, in the illustrative embodiment of FIG. 3, as well as in FIG. 1, the forward 102 and aft 106 lead-off points are arranged such that the separation distance is substantially similar to the forward 104 and aft 108 separation of the tether attachment points on the shroud, resulting in a substantially parallel linkage between the corresponding lead-off points and tether attachment points.

Such a substantially parallel linkage results in minimal pitch angle α variation due to aerostat blow down, as illustrated in FIG. 1. For any aerostat with a configuration that includes aerodynamic lift, this is critical to maintaining a constant aerodynamic lift-to-drag ratio as wind speeds vary.

In addition, as illustrated in FIG. 3, when the aerostat longitudinal axis is misaligned with the platform longitudinal axis, this forward/aft separation results in a restoring moment that causes the aerostat longitudinal axis to align itself with the platform longitudinal axis.

Finally, referring to FIG. 2, by varying their distance from the base station centerline, the side lead-off points 102 (a) and (b) can be arranged to mechanically constrain the roll angle response to lateral translation of the aerostat with respect to the base station as appropriate for a given application.

A positive roll angle response is advantageous in embodiments with aerodynamic lift by virtue of realigning the lift vector to provide a restoring force that limits the translational displacement during wind direction changes. In order to effect a positive roll angle response to lateral translation, the separation distance between the side lead-off points 102/106 on the platform must be greater than the separation distance of the side tether attachment points 104/108 on the aerostat.

In order to effect a negative roll angle response to lateral translation, the separation distance between the side lead-off points must be less than the separation distance of the side tether attachment points on the aerostat. An equal separation distance results in a neutral roll angle response to lateral translation.

Controller:

Optionally, a controller is provided to remotely and/or autonomously activate the various actuators of the aerostat system in order to perform desired operations such as, but not limited to, launching, docking, altitude changes, pitch angle changes and base station heading changes. Means of monitoring the condition of the platform, tether and aerostat, as well as external factors such as weather and mission objectives, are provided and may be used by the controller to determine the appropriate course of action and appropriate control commands.

Docked Configuration:

In a docked configuration, illustrated in FIG. 4, the aerostat is substantially rigidly secured to the platform such that the aerostat longitudinal axis and the platform longitudinal axis are substantially aligned in the horizontal plane. In the docked configuration the aerostat is secured down onto the rails 402. The tether attachment points on the aerostat 104/108 and tether lead-off points 102/106 are configured so as to provide a substantially downward tether tension force T on the aerostat. The aerostat is secured by the combination of substantially downward tether tension force T and the normal N and friction F forces imparted on the aerostat by the rails. Means besides the tether groups may be provided for positively securing the aerostat where it contacts the base station in a docked configuration.

Figure 5A:
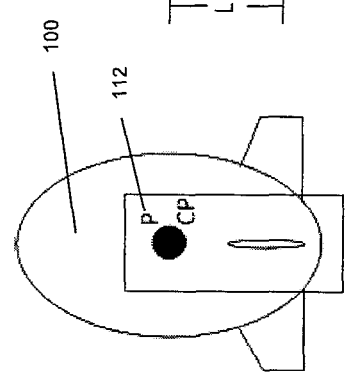
FIGS. 5(a)-5(c) are each schematic illustrations of how the separation between pivot point and center of pressure augments aerodynamic forces in the actuation of the base station platform around its pivot point.
Figure 5B:
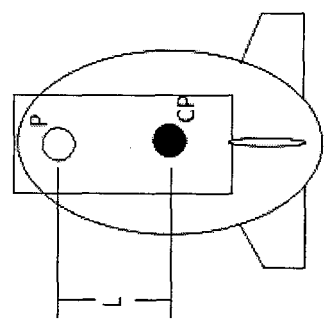
Figure 5C:
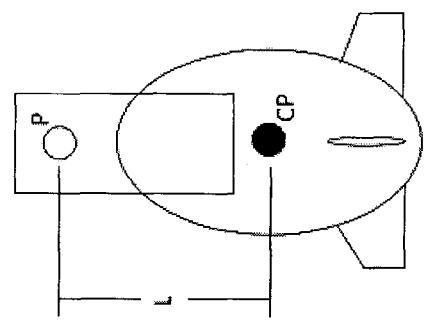

Referring to FIG. 5, by varying the distance between the center-of-pressure CP of the aerostat in the docked configuration and the platform pivot axis P, the aerodynamic forces on the aerostat that impart a moment on the docked aerostat 100 and platform 112 vary in their action on the longitudinal axes with the oncoming wind direction. This distance variation can thus be used to adjust the act of the moment-imparting aerodynamic forces to suit a given application. In one illustrative embodiment, shown in FIG. 5(c), the center-of-pressure CP of the aerostat in the docked configuration is substantially aft of the platform pivot axis P such that the aerodynamic forces on the aerostat impart a moment on the docked aerostat and platform, which acts to align the longitudinal axes with the oncoming wind direction. In an illustrative embodiment, shown in FIG. 5(a), the center-of-pressure CP of the aerostat in the docked configuration is substantially collocated with the platform pivot axis P such that the aerodynamic forces on the aerostat do not impart a moment on the docked aerostat and platform, allowing a rotational actuator to easily align the docked aerostat and platform to a specified heading.

Flight Configuration:

In a flight configuration the aerostat is substantially non-rigidly secured to the base-station by the tethers with little or no normal force or friction imparted by the rails to the aerostat. In flight configuration, the aerostat motion is constrained by the tethers, which provide the sole mechanical linkage between the aerostat and the platform, and the aerostat may move independently of the platform.

Operation

Flight Configuration:

In flight configuration, the aerostat, tethers, and platform form a mechanical system, as shown in FIG. 1, functionally similar to a parallel-bar linkage. As viewed from the side, the forward tether or tether group and the aft tether or side tether group act as two of the parallel bars. The tether groups can be at any angle relative to horizontal. The aerostat and platform act as the horizontal bars in the linkage and assume a specified relatively small angle with respect to horizontal. The aerostat need not be horizontal, as long as there is a horizontal component of the span between the forward and aft tether attachment points. For the purposes of this description either the forward or aft tether "group" can comprise a single tether, so as to provide a three-point "tricycle" harness. Alternatively the forward and/or aft tether group can consist of two or more tethers, providing at least a four-point harness.

Altitude Control

In an embodiment where the aerostat geometry is designed to produce aerodynamic lift substantially in excess of the buoyant lift, the lift-to-drag ratio is determined by the angle of attack. If one is known or controlled, the other is implicitly known or controlled.

In such an embodiment, for a given mean length of the tether group, a change in the lift-to-drag ratio of the aerostat causes blow down and a change in altitude, as represented in FIG. 1. The parallel bar linkage causes the aerostat to remain at the same pitch angle $\alpha$ relative to the ground. Further referring to FIG. 1, the effective linkage thus defines a semicircle when viewed from the side, of a radius equal to the mean tether length, upon which the aerostat is constrained for all lift-to-drag ratios.

By virtue of the aerostat retaining the same pitch angle $\alpha$ relative to the ground, the angle of attack is passively constrained in near-horizontal wind with no significant long-duration up- or down-drafts. Conversely, the pitch angle $\alpha$ can be controlled by adjusting the tether lengths, resulting in control of the aerostat's position on the semicircle whose radius is the mean tether length. Because the aerostat is restricted to positions along this circle, control of that position implies control of aerostat altitude for a given mean length of the tether group.

In addition, the invention improves the resilience of the aerostat system to rapid altitude loss and subsequent snap back during down draft conditions. The presence of a substantial downward vertical component of wind speed acts to reduce the incident angle-of-attack of the wind on the aerostat. In a conventional aerostat this results in a downward component of drag force on the aerostat and subsequent rapid loss in altitude. In the present invention, the reduction of angle-of-attack changes the lift and drag vector, but the lift vector still acts to maintain tether tension preventing a rapid loss in altitude and the subsequent tether snap back that causes damage. In extreme or prolonged down draft conditions, the pitch angle of the aerostat can be actively controlled through differential variation of the fore and aft tether group lengths to further limit the loss in altitude and blow down.

Roll Angle

Referring to FIG. 2, if the side-to-side separation of the fore tether attachment points 104 (a) and 104 (b) (and similarly, aft tether attachments 108—see FIG. 1, not shown on FIG. 2) on the aerostat is substantially different from the side-to-side separation of the base station lead-off points 102 (a) and 102 (b) (and similarly, aft lead off points 106—see FIG. 1, not shown on FIG. 2) on the platform, the aerostat roll angle will change as the aerostat translates side to side.

Figures 2A, 2B:
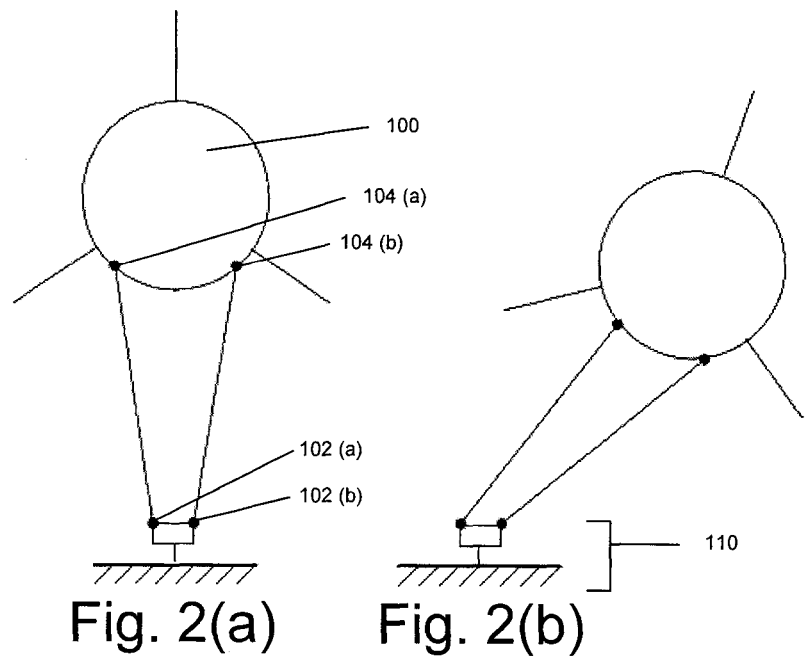
FIGS. 2(a)-2(d) are each schematic illustrations of aerostat roll direction during lateral translation based on different lead off point side to side separation distances.

FIGS. 2(a) and 2(b) shows a smaller separation on the platform than on the aerostat. In this case, tethers of fixed lengths tend to roll the aerostat outward, so its vertical axis points toward the direction in which the aerostat is translating.

Figures 2C, 2D:
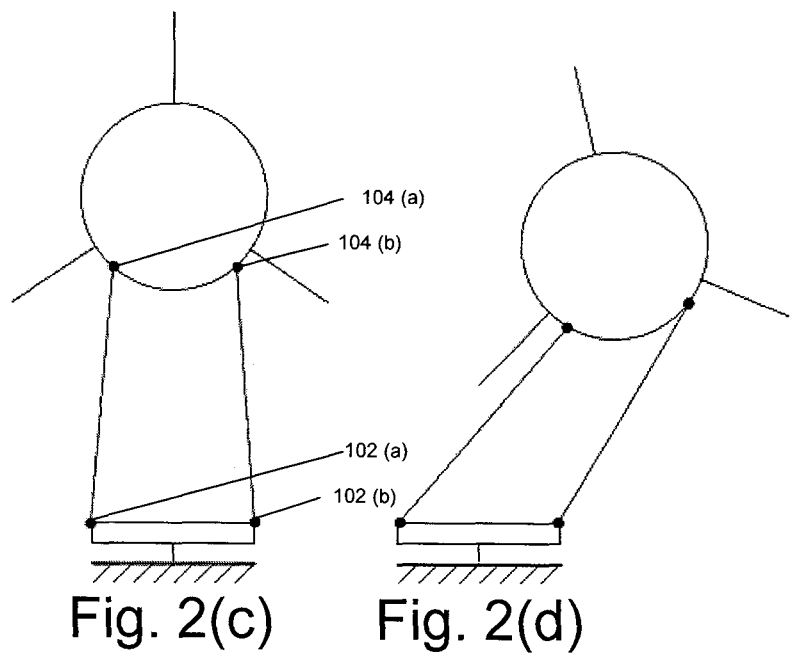

FIGS. 2(c) and 2(d) shows a larger separation on the platform than on the aerostat. With fixed tether lengths, aerostat translation to the side will tend to roll the aerostat so its vertical axis points inward, back toward the aerostat's initial position straight above the platform. The arrangement of tether attachment points and lead-off points can be arranged to produce the desired aerostat behavior.

Passive Alignment of Aerostat—Platform System

Referring to FIG. 3, the location of the platform 112 pivot axis P, combined with the separation of tether lead off points, create passive aligning moments that drive the aerostat 100 to passively align itself with the wind.

Figure 3A:
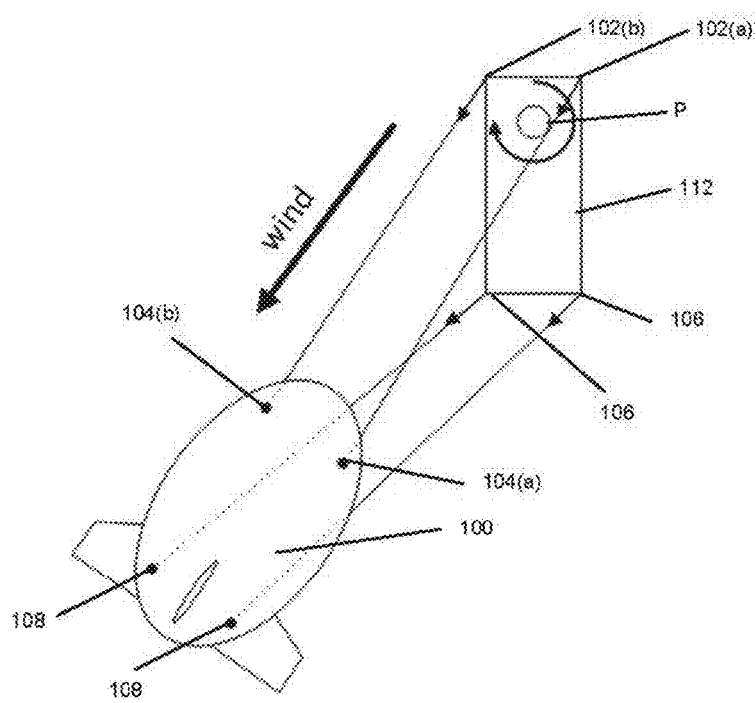
FIGS. 3(a) and 3(b) each schematic illustrations of passive alignment of the aerostat with the wind and with the base station platform based on the prevailing wind direction, respectively.

First, as is shown in FIG. 3(a), the location of the mean lead off point location behind the platform pivot axis creates an aligning moment when the longitudinal platform axis is not directed towards the aerostat location in a horizontal plane. Because the aerostat is always blown downwind in a horizontal plane, the presence of the aligning moment from the pivot axis location also causes the platform to be oriented in a way such that the platform longitudinal axis aligns itself with the wind.

Figure 3B:
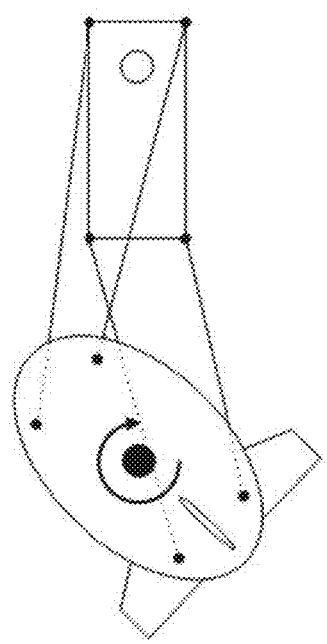

Secondly, as is also shown in FIG. 3(b), whenever the horizontal component of the aerostat longitudinal axis is not directed towards the platform, the presence of spatially-separated forward/aft and left/right tether attachment points result in a moment that drives the aerostat to align itself with the platform longitudinal axis.

Given that (a) the platform longitudinal axis is passively driven to align itself with the wind as a result of the pivot axis location and (b); given that the aerostat is passively driven to align itself with the platform longitudinal axis, it is apparent that the judicious choice of lead off points, as described previously, creates the tendency for the aerostat to passively align itself with the wind and conversely creates the tendency for the platform to align itself with the wind, thus causing the combined rotating platform—aerostat system to passively align itself with the wind.

Docking

The invention enables easier docking of the aerostat through differential length control of the tether groups, allowing the aerostat to be retracted onto the base station without auxiliary tethers that must be manually fed into auxiliary winches.

The spatially distinct tether attachment points and lead-off points, in conjunction with the individual tether's abilities to assume different tensions, provide a reaction moment to potentially de-stabilizing aerodynamic pitching and rolling moments, which is not possible with a single main tether group.

During docking the aerodynamic yawing motion and yaw heading is substantially matched by the platform, allowing docking in changing wind directions. The yaw motion of the platform may be passively actuated by the tether tensions acting on the lead-off points to align the platform with the aerostat, or the platform motion may be mechanically actuated by any system such as, but not limited to, a slewing drive. The passive aligning moment described in the Flight Configuration section and depicted in FIG. 3 has its largest effect when the aerostat is nearest to the ground, since the effective tether spring constant is inversely proportional to the length of tether released; thus, the tether imparts very strong stabilizing yaw moments with very small heading differences between the aerostat and the platform.

As described below, provisions for measuring the aerostat, tether and platform conditions, as well as a controller for controlling the aerostat system may be included in the invention to allow for adaptive autonomous control during docking.

Referring to FIG. 4, the platform 112 accommodates the aerostat docking at a variety of attitudes. This is achieved by curving or otherwise shaping the rails 402 to guide the aerostat to its intended resting configuration on the platform. The rails are designed to preclude undesired interference with the tethers.

Docked Configuration:

In the docked configuration the aerostat is secured to the platform by the multiple tether groups. The tether groups are locked or braked by their respective winches or another locking mechanism. The platform includes rails that are designed to support the aerostat in this configuration. As shown in FIG. 4, the rails 402 and tethers are arranged to secure the aerostat 100; the resultant forces are distributed among the tether tension (T), the rail normal force (N) and the rail friction force (F).

The range of wind conditions in which the aerostat can be safely docked is further enlarged by allowing the platform 112 to rotate to align with the wind direction. Rotation of the platform ensures the wind is never incident on the aerostat at a high yaw angle. Rotation of the platform may be achieved by some combination of motorized actuation of the platform and aerodynamic moment of the aerostat about the pivot. In an embodiment in which the aerostat system passively aligns with the wind direction, the aerostat center of pressure (CP) is substantially aft of the platform pivot (P), in the docked configuration. As shown in FIGS. 5(b) and 5(c), the further the separation between CP and P, the stronger the passive aligning moment will be.

The system may also include auxiliary anchors connecting the aerostat to the ground after docking. Operators put in place these anchors once the aerostat is docked. The anchors prevent rotation about the platform's pivot, and are designed to relieve the base station and tethers of a large amount of loading during very high wind conditions.

Launch Configuration

During launching operations, the multiple tether groups are paid out by the winches. Buoyant and/or aerodynamic lift causes the aerostat to rise to the desired altitude. Once there are no substantial normal or friction forces imparted on the aerostat by the rails, the same principles of operation as in flight configuration are in effect, even as the altitude of the aerostat increases.

Autonomous and Remote Operation

A control system may include one or more humans and/or computers. Such a control system monitors and controls tether pay out, reel-in, and tension, in all operational modes for autonomous or remote operation. The control system allows a human operator to remotely command the aerostat system. Alternatively, the control system may autonomously, intelligently respond to various conditions and command the aerostat system without constant human instruction.

The foregoing has been a detailed description of illustrative embodiments of the invention. Various modifications and additions can be made without departing from the spirit and scope of this invention. Each of the various embodiments described above may be combined with other described embodiments in order to provide multiple combinations of features. Furthermore, while the foregoing describes a number of separate embodiments of the apparatus and method of the present invention, what has been described herein is merely illustrative of the application of the principles of the present invention. For example, the teachings herein are applicable to a wide range, size and type of aerostats without departing from the scope of the present invention. Shape and contour of the aerostat are highly variable so long as they include the control systems and methods described herein. Additionally, directional and locational terms such as "top", "bottom", "center", "front", "back", "above", and "below" should be taken as relative conventions only, and not as absolute. Finally, the placement and location of actuators and tethers are highly variable so long as they are in accordance with the teachings shown and described herein. Accordingly, this description is meant to be taken only by way of example, and not to otherwise limit the scope of this invention.

What is claimed is:

1. An aerostat system that allows for improved control in a variety of wind conditions, passive alignment into the wind, and autonomous docking, the system comprising:
   an aerostat including a shroud;
   a plurality of tether groups arranged on the shroud so that there is defined separation distance between tether attachment points in each of a longitudinal, direction and a lateral direction, each of the plurality of tether groups being independently actuated by a respective winch assembly; and
   a base station located with respect to a ground surface including a rotating platform constructed to rotate about a pivot point that is located forward a mean lead-off position for the plurality of tether groups, the rotating platform being interconnected to the plurality of tether groups and including a rail assembly that selectively engages the aerostat in a docked configuration with respect to the platform.

2. The system as set forth in claim 1, further comprising one or more forward tether lead-off points and one or more aft tether lead-off points on the base station, the one or more forward tether lead-off points being separated from the one or more aft-tether lead-off points by a lead-off-point separation distance that has a same order of magnitude as a forward and aft separation of the tether attachment points on the shroud.

3. The system as set forth in claim 2 wherein the pitch angle is a non-zero value of between approximately 5 and 10 degrees.

4. The system as set forth in claim 1, further comprising one or more forward tether lead-off points and one or more aft tether lead-off points on the base station.

5. The system as set forth in claim 4 wherein the plurality of tether groups are arranged to define one of a three-point tether arrangement and a four-point tether arrangement.

6. The system as set forth in claim 1, wherein the plurality of tether groups are constructed and arranged to impart a moment to both the aerostat and the rotating platform, thereby causing both components to passively align into the prevailing wind direction.

7. The system as set forth in claim 1, wherein, in the docked configuration, the longitudinal separation of the pivot point of the rotating platform and a center of pressure of the aerostat is constructed and arranged to cause the aerostat system to passively align with a prevailing wind direction and prevents the docked aerostat from facing the wind at a high yaw angle.

8. The system of claim 1, wherein the defined separation distance is at least equal to ten percent of a length of the aerostat.

9. The system of claim 1, wherein the rotating platform rotates freely about the pivot point.

10. A method for tethering an aerostat that allows for improved control in a variety of wind conditions, passive alignment into the wind, and autonomous docking, the method comprising the steps of:
    providing an aerostat including a shroud;
    attaching a plurality of tether groups to the shroud so that there is defined separation distance between tether attachment points in each of a longitudinal, direction and a lateral direction, each of the plurality of tether groups being independently actuated by a respective winch assembly; and
    attaching the plurality of tether groups to a base station located with respect to a ground surface, the base station including a rotating platform constructed to rotate about a pivot point that is located forward a mean lead-off position for the plurality of tether groups, the rotating platform including a rail assembly that selectively engages the aerostat in a docked configuration with respect to the platform.

11. The method as set forth in claim 10, further comprising providing one or more forward tether lead-off points and one or more aft tether lead-off points on the base station, and separating the one or more forward tether lead-off points from the one or more aft-tether lead-off points by a lead-off-point separation distance that is a same order of magnitude as a forward and aft separation of the tether attachment points on the shroud.

12. The method as set forth in claim 11 wherein the pitch angle is a non-zero value of between approximately 5 and 10 degrees.

13. The method as set forth in claim 10 wherein the plurality of tether groups are arranged to define one of a three-point tether arrangement and a four-point tether arrangement.

14. The method as set forth in claim 10, wherein the plurality of tether groups impart a moment to both the aerostat and the rotating platform, thereby causing both components to passively align into the prevailing wind direction.

15. The method as set forth in claim 10, wherein, in the docked configuration, the longitudinal separation of the pivot point of the rotating platform and a center of pressure of the aerostat causes the aerostat system to passively align with a prevailing wind direction and prevents the docked aerostat from facing the wind at a high yaw angle.

* * * * *